(12) United States Patent
Dharmadhikari et al.

(10) Patent No.: US 11,877,201 B2
(45) Date of Patent: Jan. 16, 2024

(54) HANDOVERS FOR A USER EQUIPMENT USING A MOBILITY STATUS

(71) Applicant: CABLE TELEVISION LABORATORIES, INC., Louisville, CO (US)

(72) Inventors: Omkar Shripad Dharmadhikari, Lakewood, CO (US); Joseph Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 108 days.

(21) Appl. No.: 17/347,334

(22) Filed: Jun. 14, 2021

(65) Prior Publication Data

US 2021/0392560 A1 Dec. 16, 2021

Related U.S. Application Data

(60) Provisional application No. 63/038,289, filed on Jun. 12, 2020.

(51) Int. Cl.
| | |
|---|---|
| *H04W 4/00* | (2018.01) |
| *H04W 36/32* | (2009.01) |
| *H04W 36/06* | (2009.01) |
| *H04W 36/08* | (2009.01) |
| *H04W 84/04* | (2009.01) |

(52) U.S. Cl.
CPC .......... *H04W 36/32* (2013.01); *H04W 36/06* (2013.01); *H04W 36/08* (2013.01); *H04W 84/042* (2013.01)

(58) Field of Classification Search
CPC ..... H04W 36/32; H04W 36/06; H04W 36/08; H04W 84/042; H04W 36/00835

USPC ......................................................... 370/331
See application file for complete search history.

(56) References Cited

U.S. PATENT DOCUMENTS

| | | | | |
|---|---|---|---|---|
| 6,922,561 B2 * | 7/2005 | Chen | ...... | H04W 60/04 370/332 |
| 8,195,234 B2 * | 6/2012 | Chang | ...... | H04M 1/724 455/558 |
| 8,594,699 B1 * | 11/2013 | Mach | ...... | H04W 36/32 455/456.1 |
| 8,634,845 B2 * | 1/2014 | Frost | ...... | H04W 60/02 455/436 |
| 8,725,169 B2 * | 5/2014 | Xiao | ...... | G01S 11/02 455/524 |
| 9,078,120 B2 * | 7/2015 | Meshkati | ...... | H04W 24/02 |
| 9,125,113 B2 * | 9/2015 | Prasad | ...... | H04W 36/0088 |
| 9,173,151 B2 * | 10/2015 | Choi | ...... | H04W 36/04 |

(Continued)

*Primary Examiner* — Amancio Gonzalez
(74) *Attorney, Agent, or Firm* — Polsinelli PC

(57) ABSTRACT

Systems and methods include an access layer to perform handovers for a User Equipment (UE) using a mobility status of the UE. A source access node (e.g., a femto cell, small cell, or a macro cell) establishes a first network connection with the UE. Based on a mobility status of the UE, the source access node selects either a small cell access node or a macro cell access node as a target node for connecting to the UE with a handover (e.g., by establishing a second network connection with the UE). The UE may have a medium mobility status or a high mobility status and, in response, be connected to the macro cell access cell for continuous connectivity. Alternatively, the UE may have the low mobility status and, in response, a signal strength analysis of the access nodes may be performed to select the target node for the handover.

20 Claims, 6 Drawing Sheets

(56) References Cited

U.S. PATENT DOCUMENTS

| | | | | |
|---|---|---|---|---|
| 9,220,041 | B2* | 12/2015 | Koskinen | H04W 36/0088 |
| 9,226,197 | B2* | 12/2015 | Cui | H04W 36/30 |
| 9,253,675 | B2* | 2/2016 | Mach | H04W 24/10 |
| 9,337,979 | B2* | 5/2016 | Guo | H04L 5/0048 |
| 9,526,059 | B2* | 12/2016 | Arunachalam | H04W 36/32 |
| 9,674,757 | B2* | 6/2017 | Yiu | H04W 72/1215 |
| 9,913,202 | B2* | 3/2018 | Xu | H04W 48/04 |
| 9,922,524 | B2* | 3/2018 | Devdas | A61B 5/0024 |
| 9,930,568 | B2* | 3/2018 | Murray | H04W 36/08 |
| 9,930,589 | B2* | 3/2018 | Virtej | H04W 76/10 |
| 10,356,683 | B2* | 7/2019 | Kim | H04W 36/32 |
| 10,530,639 | B2* | 1/2020 | Dudda | H04L 41/0661 |
| 10,719,983 | B2* | 7/2020 | Levy | G01C 5/06 |
| 10,804,989 | B2* | 10/2020 | Chen | H04B 7/0639 |
| 10,904,786 | B2* | 1/2021 | Zhang | H04W 72/0453 |
| 11,005,704 | B2* | 5/2021 | Dudda | H04W 24/02 |
| 11,452,032 | B2* | 9/2022 | Gupta | H04W 4/08 |
| 2009/0098873 | A1* | 4/2009 | Gogic | H04W 48/20 455/458 |
| 2010/0124934 | A1* | 5/2010 | Mach | H04W 24/02 455/456.1 |
| 2014/0274049 | A1* | 9/2014 | Singh | H04W 36/32 455/436 |
| 2014/0335870 | A1* | 11/2014 | Yilmaz | H04W 36/32 455/441 |
| 2014/0357273 | A1* | 12/2014 | Teng | H04W 8/02 455/436 |
| 2015/0038180 | A1* | 2/2015 | Quick, Jr. | H04W 36/32 455/458 |
| 2015/0072706 | A1* | 3/2015 | Michaelsen | H04W 64/006 455/456.1 |
| 2015/0141013 | A1* | 5/2015 | Cui | H04W 48/20 455/436 |
| 2018/0084473 | A1* | 3/2018 | Nagaraja | H04W 36/0066 |
| 2021/0282064 | A1* | 9/2021 | Wang | H04W 36/32 |
| 2022/0225258 | A1* | 7/2022 | Ratasuk | H04W 56/0045 |

\* cited by examiner ns; and a second signal strength of the UE with a macro cell access node; and establishing, with a handover and based at least partly on the mobility status and one or both of the first signal strength and the second signal strength, a second network connection between the UE and the second small cell access node or the macro cell access node.

HANDOVERS FOR A USER EQUIPMENT USING A MOBILITY STATUS

CROSS-REFERENCE TO RELATED APPLICATIONS

The present application claims priority under 35 U.S.C. § 119 to U.S. Provisional Application No. 63/038,289, entitled "Connecting High Mobility UEs to Macro Cells using Inter-PLMN Handovers" and filed on Jun. 12, 2020, which is specifically incorporated by reference herein in its entirety.

FIELD

Aspects of the presently disclosed technology relate generally to network handovers and more particularly to performing handovers for a User Equipment (UE) based on a mobility status of the UE.

BACKGROUND

Network operators often deploy small cells and macro cells to create an access network and provide network coverage to a particular geographic area. To maintain connectivity with a device as it moves through the geographic area, the access network transfers the network connection between the multiple small cells and/or the macro cells with multiple cell handovers. The cell handovers are typically based on changes in the signal level of the network connection between the device and the access nodes.

However, as the handover process proceeds, applications and services operating on the device may experience temporary disruptions. For example, the handover process may not be seamless and can sometimes cause applications to pause, reconnect, or restart. Additionally, the target network may have a different signal strength, latency, or network policy with respect to the initial network, further causing applications operating on the device to be interrupted. As such, performing multiple handovers in a relatively short time frame can hamper the user experience of the device. Moreover, in some instances, a macro cell may be capable of providing consistent connectivity for a device throughout the geographic region, yet the device will still connect to multiple small cells via multiple handovers as it moves through the geographic region. This may be caused by the device detecting a stronger signal strength from the small cells as the device moves closer to the small cells. Accordingly, network resources may be used inefficiently to perform multiple handovers as the device moves through the geographic region. Since handover triggers are typically based on signal levels, high mobility users often connect to small cells performing frequent handovers in an inefficient manner and with a higher likelihood of dropped calls. These issues may degrade the user experience.

SUMMARY

Implementations described and claimed herein address the foregoing by providing systems and methods for performing handovers for a User Equipment (UE) based on a mobility status of the UE. In some examples, method for managing handovers for a user equipment (UE) connected to a first network via a first access node of one or more access nodes includes: determining a mobility status of the UE; determining: a first signal strength of the UE with a second small cell access node of the one or more small cell access nodes; and a second signal strength of the UE with a macro cell access node; and establishing, with a handover and based at least partly on the mobility status and one or both of the first signal strength and the second signal strength, a second network connection between the UE and the second small cell access node or the macro cell access node.

In some instances, the second small cell access node operates on a first frequency; the macro cell access node operates on a second frequency; and establishing the second network connection includes instructing the UE to connect to the first frequency or the second frequency in response to the mobility status. The first small cell access node, the second small cell access node, and the macro cell access node may be associated with a common Public Land Management Network (PLMN) value. The second small cell access node may be associated with a first PLMN value; the macro cell access node may be associated with a second PLMN value; and establishing the second network connection includes instructing the UE to connect to the first PLMN value or the second PLMN value at least partly in response to the mobility status. The first small cell access node, the second small cell access node, and the macro cell access node may operate on a common frequency. Determining the mobility status of the UE may include determining that the UE has a low mobility status. The mobility status may be a first mobility status, the handover may be a first handover, and the method can further comprise: determining a second mobility status of the UE, the second mobility status being a medium mobility status or a high mobility status; and establishing, with a second handover and based at least partly on the second mobility status being the medium mobility status or the high mobility status, a third connection with the macro cell access node.

In some examples, a method for managing handovers for a UE includes establishing a first network connection between the UE and a first small cell access node of one or more small cell access nodes; determining that a mobility status of the UE is a low mobility status, a medium mobility status, or a high mobility status; selecting, based on the mobility status, a second small cell access node of the one or more small cell access nodes or a macro cell access node for a handover; and establishing, with the handover, a second network connection between the UE and the second small cell access node or the macro cell access node.

In some instances, determining that the mobility status is the low mobility status, the medium mobility status, or the high mobility status includes determining that the mobility status is the low mobility status; and establishing the second network connection is, at least partly in response to the low mobility status, based on a first signal strength of the first small cell access node and a second signal strength of the macro cell access node. The mobility status may be a first mobility status, the handover a first handover, and the method can further comprise: determining that a second mobility status of the UE is the medium mobility status or the high mobility status; and establishing, with a second handover, a third network connection between the UE and the macro cell access node based on the second mobility status of the UE being the medium mobility status or the high mobility status. Determining that the mobility status is the low mobility status, the medium mobility status, or the high mobility status may include determining that the mobility status is the medium mobility status or the high mobility status; and establishing the second network connection may include, in response to the medium mobility status or the high mobility status, establishing the second network connection with the macro cell access node. The mobility status may be a first mobility status, the handover a first handover, and the method can further comprise: determining that a second mobility status of the UE is the low mobility status; and establishing, with a second handover, a third network connection between the UE and a third small cell access node based on the second mobility status of the UE being the low mobility status.

The method can further comprise determining a number of previous cell reselections for the UE or previous handovers for the UE; and determining whether the number exceeds one or more threshold values, the mobility status being based on whether the number exceeds the one or more threshold values. The method can further comprise determining an average active connection time for the UE; and determining whether the average active connection time exceeds a threshold value, the mobility status being based on whether the average active connection time exceeds the threshold value. The second small cell access node may be associated with a first public land mobility network (PLMN) value; the macro cell access node may be associated with a second PLMN value that is different than the first PLMN value; and establishing the second network connection can include instructing the UE to connect to the first PLMN or the second PLMN at least partly in response to the mobility status. The second small cell access node may operate on a first frequency; the macro cell access node may operate on a second frequency that is different than the first frequency; and establishing the second network connection can include instructing the UE to connect to the first frequency or the second frequency at least partly in response to the mobility status. The method can further comprise determining one or more device parameters of the UE, the one or more device parameters including at least one of a type of device or a device state, selecting the second small cell access node or the macro cell access node being based at least partly on the one or more device parameters. The type of device may be a cellular type of device or an internet-of-things (IoT) type of device and the device state may be a connected mode or an idle mode. Establishing the second network connection can be part of a load balancing process performed by the first small cell access node.

In some examples, an access node for managing handovers for a user equipment (UE) includes: one or more processors; and one or more memory devices storing instructions that, when executed by the one or more processors, cause the access node to: establish a first network connection with the UE; determine whether a mobility status of the UE is a low mobility status, a medium mobility status, or a high mobility status; determine, if the mobility status of the UE is the low mobility status, a first signal strength between the UE and a small cell access node; determine, if the mobility status of the UE is the low mobility status, a second signal strength between the UE and a macro cell access node; and establish, if the mobility status of the UE is the low mobility status, a second network connection between the UE and the small cell access node or the macro cell access node based at least partly on the first signal strength and the second signal strength; and establish, if the mobility status of the UE is the medium mobility status or the high mobility status, the second network connection between the UE and the macro cell access node.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
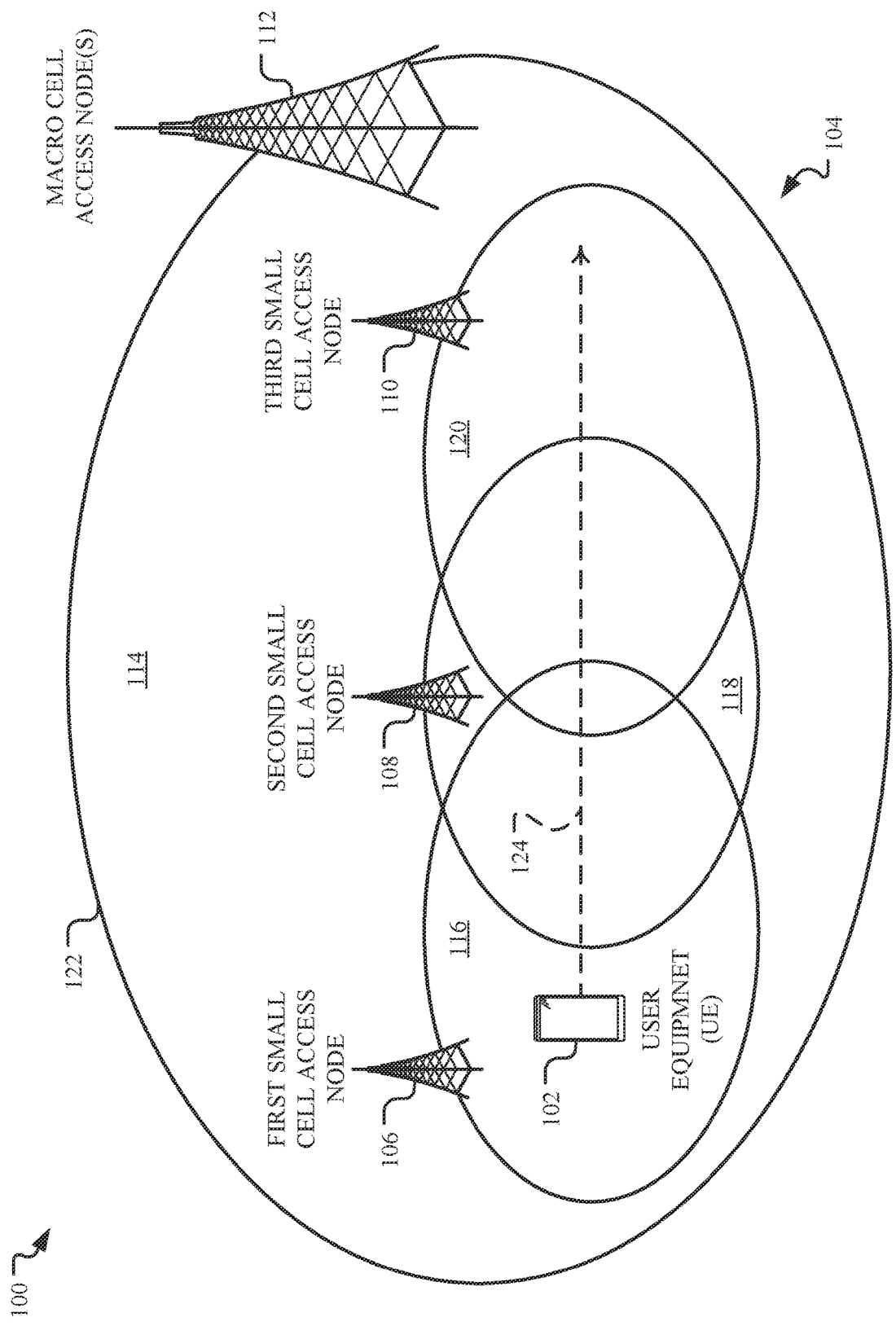
FIG. 1 illustrates an example system for performing handovers for a User Equipment (UE) based on a mobility status of the UE.

Aspects of the present disclosure involve systems and methods for performing handovers for a UE based on a mobility status of the UE. The UE can be stationary or moving through a geographic region (e.g., a street, a building, a city, a county, etc.) covered by an access layer of a wireless network, such as a Third Generation Partnership Project (3GPP) network. A source access node providing connectivity to the UE can perform a handover procedure. During the handover procedure, the source access node determines a mobility status (e.g., low, medium, high, etc.) of the UE and whether to perform a signal strength analysis for providing connectivity. For example, where the source access node determines the UE has a low mobility status, the UE may be connected a target access node based on a signal strength analysis. If the UE has the medium or high mobility status, the source access node determines whether the UE would be better served by a macro cell access node providing a larger coverage area and continuous coverage regardless of signal strength. The UE can be connected to the macro cell access node while the medium mobility status or high mobility status persists, and once the mobility status reverts to the low mobility status, the target mode can be determined based on the signal strength analysis.

Moreover, in some examples, the transitions back and forth between the macro cell access node and a signal strength analysis that connects to the small cell access nodes or the macro cell access node can be further based on device parameters of the UE in combination with the mobility status. In this manner, the more continuous coverage of the macro cell access node can be provided to the UE when applications operating on the UE (or particular UE device features) need more reliable coverage. When applications involving higher signal strength or that are less reliant on continuous coverage are operating or otherwise detected, a handover may transfer the UE to the small cell access nodes or a macro cell access node based on the signal strength analysis. Additionally or alternatively, a handover may similarly transfer the UE based on the signal strength analysis in response to mobility status changes.

Performing handovers based on the mobility status improves the user experience of the UE by avoiding a series of rapid access node handovers when the UE has the medium mobility status or the high mobility status and is moving quickly through the geographic region covered by the access layer. Additionally, network resources used to perform handovers for the UE can be significantly reduced by selecting between the small cell access node and the macro cell access node and establishing the second network connection based on the mobility status. For instance, as discussed in greater detail below, shifting high mobility traffic from the small cell access nodes to the macro cell access nodes with a single handover avoids performing a series of rapid and unnecessary handovers between the small scale access nodes which, in turn, reduces overall network resource requirements (e.g., processing requirements of the network and corresponding power requirements). Additional advantages of the presently disclosed technology will be readily apparent from the present disclosure.

FIG. 1 illustrates an example system 100 for performing handovers for a UE 102. The system 100 includes an access layer 104 for a 3rd Generation Partnership Project (3GPP) network, such as a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like, with combinations of the aforementioned networks operated by a Multiple Network Operator (MNO). Additionally, in some instances, the access layer 104 provides access to other types of networks such as public or private Wide Area Networks (WAN)s, Local Area Networks (LAN)s (e.g., Bluetooth®, Wi-Fi, etc.) and the like. The access layer 104 can include one or more small cell access nodes, such as a first small cell access node 106, a second small cell access node 108, and/or a third small cell access node 110. The small cell access nodes may be low-powered or short-range radio access nodes for connecting the UE 102 to a core network (e.g., a Mobility Management Entity (MME) of an Evolved Packet Core (EPC)), directly, and/or via one or more relays to other access nodes of the access layer 104. For instance, the small cell access nodes may have a range of few meters (e.g., between 10 meters and 1000 meters) or a few kilometers (e.g., between 1 kilometer and 5 kilometers). In some instances, one or more small cell access nodes (e.g., the first small cell access node 106, the second small cell access node 108, and/or the third small cell access node 110) include a 3GPP small cell or femto cell, such as an eNodeB or Home eNodeB, or a short-range access node for other types of networks. The access layer 104 may include one or more macro cell access node(s) 112 for providing long-range coverage (e.g., multiple kilometers, such as between 1 and 20 kilometers) for the UE 102, and can include a radio tower and/or high-powered antenna.

In some instances, the access nodes including the small cell access node(s) (e.g., the first small cell access node 106, the second small cell access node 108, and/or the third small cell access node 110) and the macro cell access node 112 are operated by a multiple network operator (MNO) and/or by a Multiple Service Operator (MSO) to provide wireless network coverage for a geographic region 114 (e.g., a street, a portion of a city or county, a park, etc.). The access nodes may provide access to a same core network or, in some instances, different core networks. For instance, the access nodes may be associated with same or different Public Land Mobility Network (PLMN) values and/or on same or different frequencies, as discussed in greater detail below regarding FIG. 2.

In some examples, the UE 102 establishes a first network connection with a first access node, such as the first small cell access node 106 and may move through the geographic region 114. For instance, the UE 102 may be carried by a user moving across a geographic area causing the UE 102 to travel from a first coverage area 116 of the first small cell access node 106 into a second coverage area 118 of the second small cell access node 108, and/or a third coverage area 120 of the third small cell access node 110. At least a portion (or an entirety) of the first coverage area 116, the second coverage area 118, and/or the third coverage area 120 may be overlaid with a fourth coverage area 122 of the macro cell access node 112. The fourth coverage area 122 of the macro cell access node 112 may be significantly larger than the coverage areas of the one or more small cell access nodes due to a stronger transmit power of the macro cell access node and, in some instances, fully includes multiple, smaller coverage areas. Moreover, the first coverage area 116 may overlap with the second coverage area 118 and/or the third coverage area 120, and the second coverage area 118 may also overlap with the third coverage area 120. As the UE 102 moves through the geographic region 114, it may move away from the first small cell access nodes 106 and closer to the second small cell access node 108, the third small cell access node 110, and/or the macro cell access node(s) 112, causing the UE 102 to have the signal strength of the first connection with first small cell access node 106 decrease. As such, the system 100 (e.g., at first small cell access node 106) may determine to perform a handover from the first small cell access node 106 to another access node providing network coverage to the UE 102.

For instance, the first small cell access node 106 may perform a handover cell selection process to determine which of the second small cell access node 108, the third small cell access node 110 or the macro cell access node 112 will establish a second network connection with the UE 102. The UE 102 may be within multiple overlapping coverage areas at any one time (either moving through the geographic area or while stationary) and, as such, the access node or "source" access node to which the UE 102 is currently connected (e.g., the first small cell access node 106) may have multiple other access nodes to choose from (e.g., multiple potential "target" access nodes) for establishing the second network connection with the UE 102. When the UE 102 is at a location with overlapping coverage of the second coverage area 118, the third coverage area 120 and/or the fourth coverage area 122, the source access node may select a target access node from a group of nodes including the second small cell access node 108, the third small cell access node 110 or the macro cell access node(s) 112. As discussed in greater detail below regarding FIG. 2, the source access node may collect information from the other access nodes of the access layer 104 for making the selection. Moreover, the source access node (e.g., the first small cell access node 106) may determine a mobility status 124 of the UE and select the target access node for establishing the second network connection based at least partly on the mobility status 124, as discussed in greater detail below.

In some examples, the mobility status 124 of the UE 102 may indicate an amount of movement, a velocity, and/or a change in location of the UE 102. The mobility status 124 may indicate how rapidly the UE 102 is moving through the first coverage area 116, the second coverage area 118, the third coverage area 120, and/or the fourth coverage area 122. The source node (e.g., the first small cell access node 106) may determine the mobility status 124 based on information received from the UE 102 and/or information received from other access nodes of the access layer 104.

As discussed in greater detail below, the source access node may select the target node based on (e.g., in response to or at least partly in response to) the mobility status 124 of the UE 102. For instance, in response to determining that the UE 102 has a low mobility status, the source access node may determine that either another small cell access node (e.g., the second small cell access node 108 or the third small cell access node 110) or the macro cell access node(s) 112 are an acceptable target access node for the second network connection established by the handover. Accordingly, in response to the low mobility status, the source node may determine signal strength values of the other access nodes of the access layer 104 (e.g., the second small cell access node 108, the third small cell access node 110, and/or the macro cell access node 112) and base the selection of the target node on the signal strengths. In response to determining that the UE 102 has a medium mobility status or a high mobility status the source node may select (e.g., from a group of access nodes including the second small cell access node 108, the third small cell access node 110, and/or the macro cell access node(s) 112) the macro cell access node 112 as the target node and cause the UE 102 to establish the second network connection with the macro cell access node 112 (e.g., bypassing a signal strength analysis of the small cell access nodes 108 and/or 110 and the macro cell access node 112).

In some examples, basing the selection of the target node on the mobility status 124 of the UE 102 may improve the operation of the network by reducing a number of handovers the UE 102 experiences as the UE 102 moves through the geographic region 114. For instance, connecting the UE 102 with the macro cell access node(s) 112 while the UE 102 has the medium mobility status or the high mobility status keeps the UE 102 connected to the access layer 104 with a continuous network connection as the UE 102 moves through the first coverage area 116, the second coverage area 118, and the third coverage area 120 of the small cell access nodes. The UE 102 avoids frequent handovers in rapid succession between each of the small cell access nodes by instead connecting to the macro cell access node(s) 112. Accordingly, the system can improve a user experience of the UE 102 (e.g., by avoiding disruptions to services that rely on the network connection) and improve the efficiency and allocation of network resources by reducing an overall number of handovers the UE 102 experiences as it moves through the geographic region 114.

Figure 2:
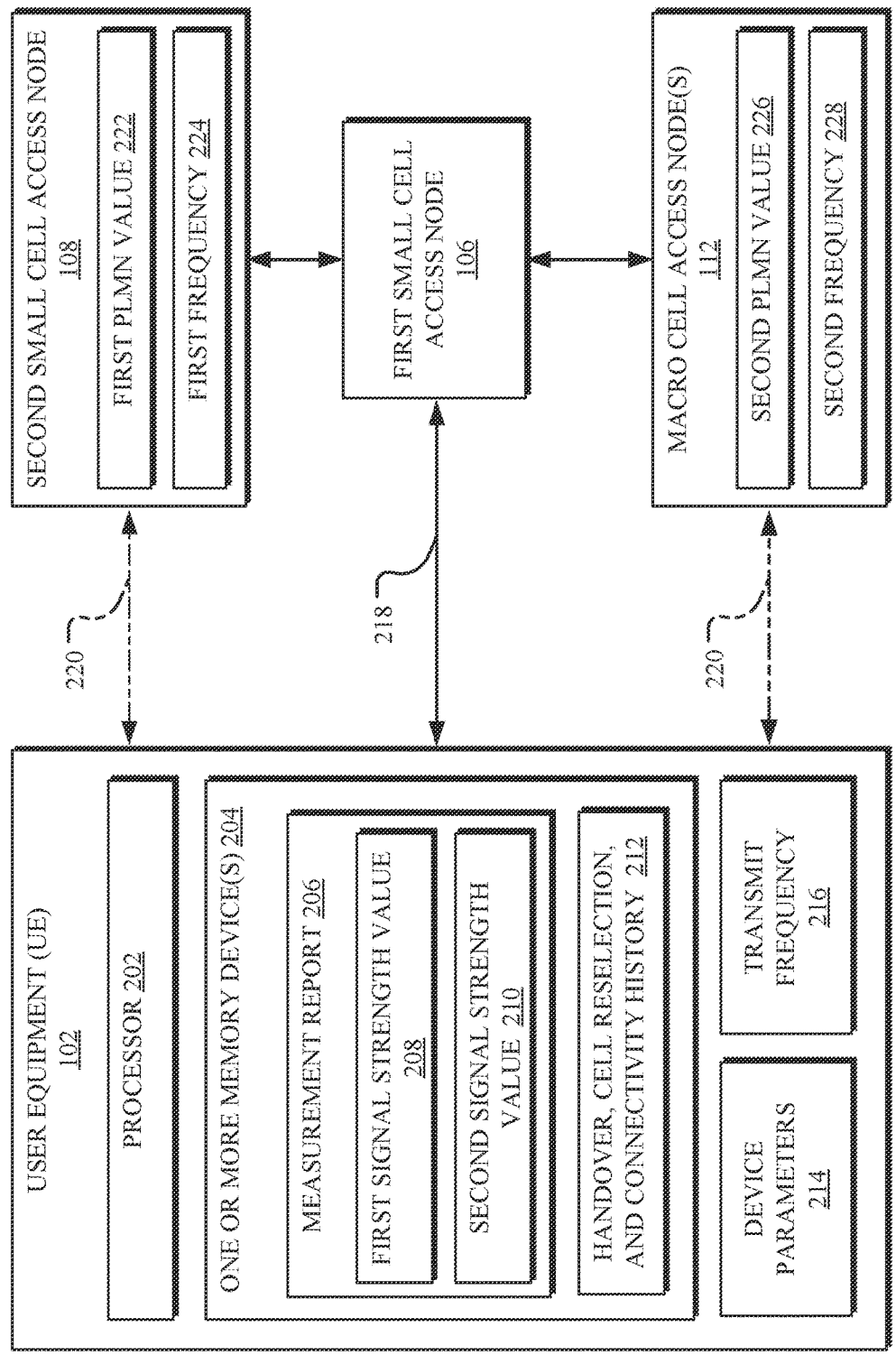
FIG. 2 illustrates an example system for performing handovers for a UE based on a mobility status of the UE, which may form at least a portion of any of the systems discussed herein.

FIG. 2. illustrates an example system 200 for performing handovers for the UE 102 which may form at least a portion of any of the systems discussed herein. The UE 102 may include a processor 202 and one or more memory device(s) 204 storing various types of data and information related to the UE 102 which can be accessed or received by the source node (e.g., the first small cell access node 106) to perform the handover process. Hardware components of the UE 102 are discussed in greater detail below regarding FIG. 3.

In some examples, the UE 102 may generate and/or store at the memory device(s) 204 one or more measurement report(s) 206. The UE 102 generates the measurement report(s) 206 periodically by scanning frequencies accessible to the UE 102 to detect any access nodes that might be available as target access nodes for the handover. For instance, the measurement report(s) 206 may include data such as a first signal strength value 208 of the second small cell access node and/or a second signal strength value 210 of the macro cell access node(s) 112. The signal strength values 208 and/or 210 may be Reference Signal Received Power (RSRP) values, Reference Signal Received Quality (RSRQ) values, or Received Signal Strength Indicator (RSSI) values. The measurement report(s) 206 may be generated while the UE 102 is in an idle mode or a connected mode and based on information transmitted between the UE 102 and the access nodes via, for instance, one or more System Information Block (SIB) and/or Radio Resource Control (RRC) messages (e.g., as part of a handover process).

In some examples, the UE 102 may generate and/or store a handover, cell reselection, and connectivity history 212. The handover, cell reselection, and connectivity history 212 may include data indicating a number of previous cell reselections and/or a number of previous handovers for the UE 102 during a previous, predetermined time period (e.g., an evaluation time period). Additionally, or alternatively, the handover, cell reselection, and connectivity history 212 may include a connectivity history of the UE 102, such as a list of previous access nodes that the UE 102 connected to and/or a connection time indicating how long the UE 102 was connected to the previous access nodes. The UE 102 may store, in the memory device(s) 204 one or more device parameters 214, such as data indicating a type of device of the UE 102 (e.g., a cellular mobile device type, an Internet-of-Things (IoT) device type, a wearable device type, an automobile device type, etc., a manufacturer, a device model, etc.), a device state of the UE 102 (e.g., idle mode or connected mode), and/or one or more characteristics or requirements of applications operating on the UE 102 (e.g., a browser, mapping application, virtual reality application, etc.). The UE 102 may further include a transmit frequency 216 for connecting to the access layer 104, which may be tunable to a particular frequency for connecting to particular access nodes.

In some examples, the source access node, such as the first small cell access node 106, may establish a first network connection 218 with the UE 102. The source access node can perform a handover procedure that includes determining the mobility status 124 of the UE 102. For instance, the first small cell access node 106 may send a request for and/or receive the handover, cell reselection, and connectivity history 212 from the UE 102. The first small cell access node 106 may analyze the handover, cell reselection, and connectivity history 212 to determine the mobility status 124. For instance, the first small cell access node 106 may receive and/or store one or more threshold values for handovers or cell reselections occurring within a predetermined evaluation time period. The first small cell access node 106 may determine, based on the handover, cell reselection, and connectivity history 212, a number of handovers or cell reselections the UE 102 experienced during the predetermined time period, and compare the number of handovers or cell reselections to the one or more threshold values to determine if the number of handovers or cell reselections exceeds the one or more threshold values. If the one or more cell reselections or handovers meets or exceeds the one or more threshold values, the small cell access node 106 determines that the UE 102 has the medium mobility status or the high mobility status. If the one or more cell reselections or handovers is below the one or more threshold values, the first small cell access node 106 determines that the UE 102 has the low mobility status. The one or more threshold values may be an ncellChange-High value and/or an ncellChange-Medium value according to 3GPP standards.

In some examples, the source access node, such as the first small cell access node 106, may determine the mobility status 124 of the UE 102 based on the list of previous access nodes that the UE 102 connected to and the connection time indicating how long the UE 102 was connected to the previous access nodes (e.g., included in the handover, cell reselection, and connectivity history 212 of the UE). The first small cell access node 106 may receive the list from the UE 102 and determine an average active connection time for the UE 102 based on the handover, cell reselection, and connectivity history 212, and may determine whether the average active connection time exceeds a threshold value. If the average active connection time exceeds or meets the threshold value, the first small cell access node 106 determines that the mobility status 124 is the low mobility status. If the average active connection time is less than the threshold value, the first small cell access node 106 determines that the mobility status 124 is the medium mobility status or the high mobility status.

The first small cell access node 106 may receive additional information from the UE 102, such as the device parameters 214 of the UE 102. The device parameters 214 can be included in a periodic report sent to the first small cell access node 106 from the UE 102, such as the measurement report 206, or received in response to a request sent from the first small cell access node 106 to the UE 102. The first small cell access node 106 may base the selection of the target access node on the device parameters in addition to the mobility status 124, as discussed in greater detail below.

In some examples, in response to determining the mobility status 124 of the UE 102 (and/or the device parameters 214), the source access node (e.g., the first small cell access node 106) selects an access node from a group of access nodes including the second small cell access node 108, the third small cell access node 110, and the macro cell access node(s) 112 to establish a second network connection 220 with the UE 102 via the handover. The source node may receive data from the UE 102 (e.g., the measurement report 206) and from other access nodes of the access layer 104 to determine which access nodes are available as target access nodes (e.g., are providing coverage to the UE 102). In response to determining that the mobility status 124 is the medium mobility status or the high mobility status (e.g., and that the UE 102 is within the fourth coverage area 122 of the macro cell access node(s) 112), the first small cell access node 106 may instruct the UE 102 to establish the second network connection 220 with the macro cell access node 112, bypassing a signal strength analysis of the access nodes. Alternatively, in response to determining that the mobility status 124 is the low mobility status, the first small cell access node 106 may compare the first signal strength value 208 of the second small cell access node 108 to the second signal strength value 210 of the macro cell access node 112 (e.g., as provided in the measurement report 206), and instruct the UE 102 to connect to whichever access node has the greater signal strength value.

In some examples, upon selecting the target node and determining to perform the handover to establish the second network connection 220, the source access node (e.g., the first small cell access node 106) may send a handover instruction to the UE 102. The handover instruction may include an indication of a first PLMN value 222 associated with the second small cell access node 108 or a first frequency 224 (e.g., or a first frequency range or band) associated with the second small cell access node 108. The UE 102 may receive the handover instruction and, in response, connect to the network associated with the first PLMN value 222 via the second small cell access node 108 (e.g., for an inter-PLMN handover). In response to the handover instruction, the UE 102 may change the transmit frequency 216 to correspond with the first frequency 224 (e.g., for an inter-frequency handover). The handover may be either an inter-PLMN handover or an inter-frequency handover to form the second network connection 220 between the UE 102 and the second small cell access node 108. Additionally, or alternatively, the handover instruction may include an indication of a second PLMN value 226 associated with the macro cell access node 112 or a second frequency 228 (e.g., or a second frequency range or band) associated with the macro cell access node 112. In response, the UE 102 may connect to the network associated with the second PLMN value 226 via the macro cell access node 112. The UE 102 may use the second PLMN value 226 to identify the target network (e.g., for the inter-PLMN handover) and/or the UE 102 may change the transmit frequency 216 to correspond with second frequency 228 of the macro cell access node 112 (e.g., for the inter-frequency handover) to complete the handover process.

In some examples, the access nodes of the access layer 104 may be associated with a common PLMN value and may operate on different frequencies. For instance, the small cell access nodes (e.g., the first small cell access node 106, the second small cell access node 108, and/or the third small cell access node 110) and the macro cell access node 112 may be operated by a same operator, such as an MNO. The MNO may own, license, and/or operate on multiple different frequency spectrums with different access nodes assigned different frequencies while being associated with a common, single PLMN value. In some instances, the access nodes of the access layer 104 may operate on a common frequency and may be associated with different PLMN values. For instance, the small cell access nodes (e.g., the first small cell access node 106, the second small cell access node 108, and/or the third small cell access node 110) and the macro cell access node 112 may be operated by a same operator, such as a Multiple Services Operator (MSO). The MSO might operate a network (or multiple, interconnected networks) with the access nodes on a common frequency, such as a Citizens Broadband Radio Service (CBRS) frequency, and may use multiple, different PLMN values to distinguish different components of the access layer 104 (e.g., different access nodes). In some instances, multiple MSOs and/or MNOs may provide access to multiple networks or combinations of inter-connected networks with the access layer 104 such that a series of handovers might include a combination of inter-frequency handovers and inter-PLMN handovers.

In some examples, the first small cell access node 106 may consider both the mobility status 124 and the device parameters 214 to determine which access node is the target access node of the handover. For instance, the source node (e.g., the first small cell access node 106) may determine that the device parameters 214 of the UE 102 include data indicating a type of device (e.g., that the UE 102 is a cellular mobile device type, an Internet-of-Things (IoT) device type, a wearable device type, an automobile device type, a manufacturer of the UE 102, a device model of the UE 102, etc.), a device state of the UE 102 (e.g., that the UE 102 is in idle mode or connected mode), and/or one or more characteristics or requirements of applications operating on the UE 102 (e.g., a browser, mapping application, virtual reality application, etc.). The source access node may determine that particular device parameters 214 correspond to network characteristics of candidate target nodes (e.g., the second small cell access node 108, the third small cell access node 110, and/or the macro cell access node 112), and select the target node from the candidate target nodes based at least in part on the device parameters 214 (e.g., in addition to being based in part on the mobility status 124). For instance, the source node may determine that the device type of the UE 102 or applications executing on the UE 102 require a particular latency, download rate, upload rate, security policy, etc., and that one of the small cell access nodes or the macro cell access node 112 is better suited (e.g., has more network resources available) for the UE 102 than others, and take this into consideration when selecting the target node. In some instances, selecting the target node and/or establishing the second network connection 220 can be part of a load balancing process performed by the first small cell access node 106. For instance, in addition to the mobility status 124, the target node may be selected based at least partly on a first amount of network traffic of the target node being less than a first threshold value and/or based at least partly on a second amount of network traffic of the source node being greater than a second threshold value. In some examples, the source node may determine that the UE 102 has the medium mobility status or the high mobility status and that the UE 102 has a device state of being idle mode and may, in response to the device state being idle mode and as part of the load balancing process, cause the UE 102 to form the second network connection 220 with the second small cell access node 108 instead of the macro cell access node 112 or vice versa depending on the traffic demands on the different access nodes.

In some examples, the source access node has a dynamically generated neighbor list of data identifying the other access nodes, which can include node information, such as node locations (e.g., or proximity to the source access node), node transmission powers, node signal strength, network PLMN value(s) associated with the node, transmission frequency (e.g., band or range), site identifier, operator identifier, interface policies, and the like. The source access node (e.g., the first small cell access node 106) can include neighbor information configured dynamically with continuous updates or it can be configured statically.

After performing the handover, which could be a first handover, the new source access node (either the second small cell access node 108 or the macro cell access node 112) can perform a second handover based on another change in the mobility status 124 (e.g., from the high or medium mobility status to the low mobility status or vice versa). For instance, the second handover could establish a third network connection between the third small cell access node 110 and the UE 102, or, in instances where the mobility status changes to the medium mobility status or the high mobility status, between a second macro cell access node and the UE 102. The methods and operations discussed herein could be repeated any number of times for any number of handovers to maintain a continuous user experience as the UE 102 undergoes changes to the mobility status 124. Additionally, in some instances, transitions back and forth between the macro cell access node(s) 112 and the small cell access nodes may be further based on the device parameters 214 (e.g., with the mobility status), such that the more constant coverage of the macro cell access node 112 is more likely to be provided to the UE 102 when the applications operating on the UE 102 require constant coverage, and coverage from small cell access nodes is provided when the applications require higher signal strength or are less reliant on continuous coverage. Accordingly, considering the mobility status 124 and the device parameters 214 to select the target access node for the handover can improve the user experience of the UE 102 and is scalable for many UEs 102 across many access layers 104 in many geographic regions 114.

Moreover, network resources to perform handovers for the UE 102 can be reduced by selecting between the second small cell access node 108 and the macro cell access node 112 and establishing the second network connection based on the mobility status 124 of the UE 102. For instance, a car with a user's UE 102 traveling down a street covered by the access layer 104 can have the UE 102 switch to the macro cell access node 112 to avoid a quick succession of handovers between a series of small cell access nodes—from the first small cell access node 106 to the second small cell access node 108 and the third small cell access node 110, or a fourth small cell access node, etc.—that may run along the street. The macro cell access node 112 can provide consistent connectivity with only the single handover while the UE 102 has the high mobility status. Once the mobility status of the UE 102 changes again (e.g., from the high mobility status or the medium mobility status to the low mobility status), the UE 102 may have another handover back to a small cell access node (e.g., providing higher signal strength) until another mobility status change is detected. As such, high mobility traffic can be shifted from the small scale access nodes to the macro scale access node(s) 112 to reduce overall network resource requirements (e.g., by reducing processing requirements of the network and corresponding power system requirements for the processing servers) while increasing network performance (e.g., by maintaining longer periods of connectivity).

Figure 3:
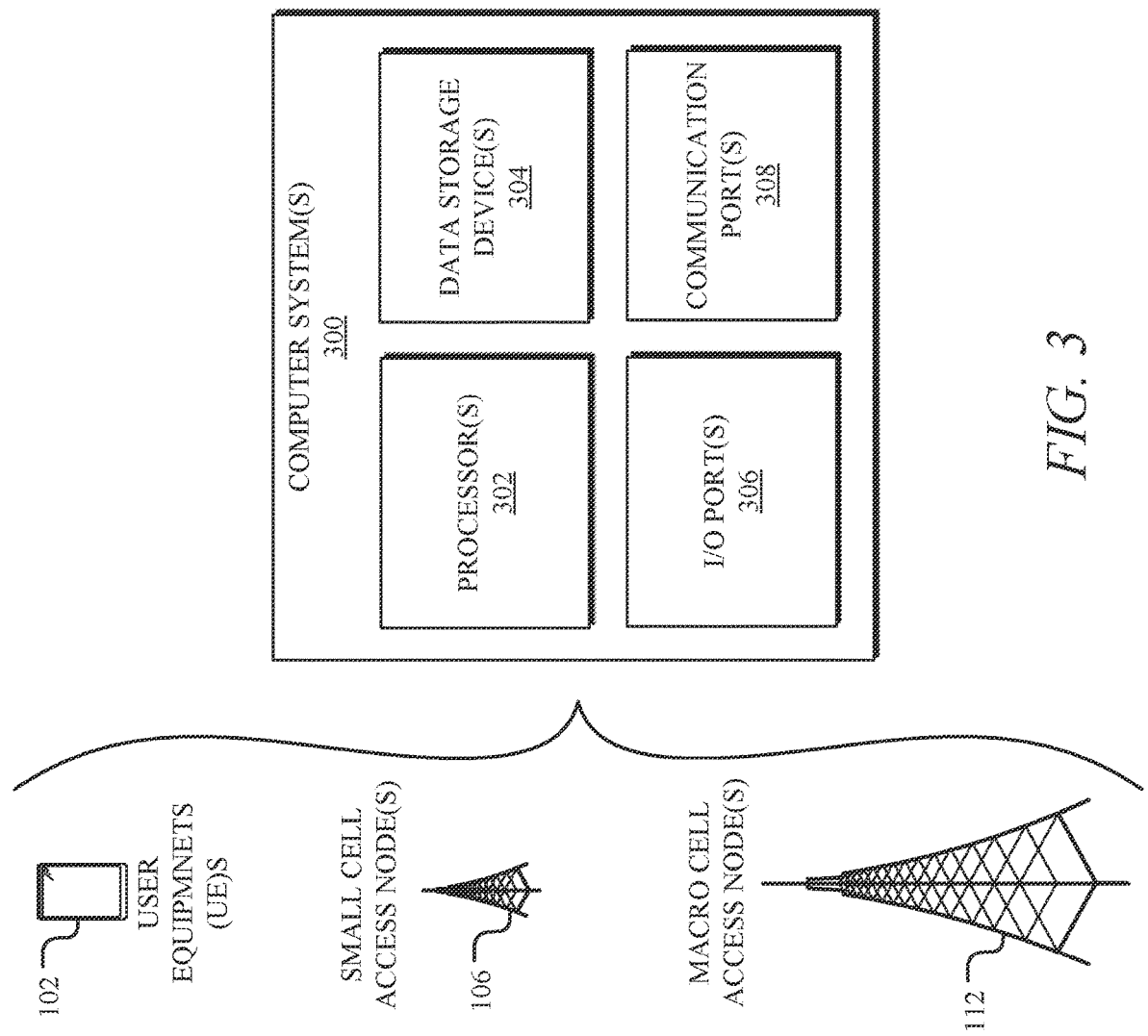
FIG. 3 illustrates an example computing system which may form at least a portion of any of the systems discussed herein.

FIG. 3 illustrates an example of one or more computer system(s) 300 which may form at least a portion of any of the systems discussed herein. Referring to FIG. 3, disclosed is an example computer system 300 having one or more computing units which may implement the systems and methods discussed herein. It will be appreciated that specific implementations of these devices may be of differing possible specific computing architectures not all of which are specifically discussed herein but will be understood by those of ordinary skill in the art.

In some instances, the computer system(s) 300 may be or form at least a portion of the UE 102, which could be a computer, a desktop computer, a laptop computer, a cellular or mobile device, a smart mobile device, a wearable device (e.g., a smart watch, smart glasses, a smart epidermal device, etc.) an Internet-of-Things (IoT) device, a smart home device, a medical device, a virtual reality (VR) or augmented reality (AR) device, a vehicle (e.g., a smart bicycle, an automobile computer, etc.), combinations thereof, and the like. In additional or alternative examples, the computer system 300 illustrated in FIG. 3 can form at least a portion and/or perform the functions of the first small cell access node 106, the second small cell access node 108, the third small cell access node 110, and/or the macro cell access node(s) 112 or other core network functions (NF)s communicating with the access layer 104.

The computer system 300 may be capable of executing a computer program product to execute a computer process. Data and program files may be input to the computer system 300, which reads the files and executes the programs therein.

Some of the elements of the computer system 300 are shown in FIG. 3 (and FIG. 2 illustrating the UE 102 example of the computer system 300), including one or more hardware processors 302 (e.g., which may be similar or identical to the processor 202), one or more data storage devices 304 (e.g., which may be similar or identical to the one or more memory device(s) 204), one or more I/O ports 306, and/or one or more communication ports 308. Additionally, other elements that will be recognized by those skilled in the art may be included in the computer system 300 but are not explicitly depicted in FIG. 3 or discussed further herein. Various elements of the computer system 300 may communicate with one another by way of one or more communication buses, point-to-point communication paths, or other communication means not explicitly depicted in FIG. 3.

The processor 302 (e.g., the processor 202) may include, for example, a central processing unit (CPU), a microprocessor, a microcontroller, a digital signal processor (DSP), and/or one or more internal levels of cache. There may be one or more processors 302, such that the processor 302 comprises a single central-processing unit, or a plurality of processing units capable of executing instructions and performing operations in parallel with each other, commonly referred to as a parallel processing environment.

The computer system 300 may be a conventional computer, a distributed computer, or any other type of computer, such as one or more external computers made available via a cloud computing architecture. The presently described technology is optionally implemented in software stored on the data storage device(s) 304 (e.g., the one or more memory device(s) 204), and/or communicated via one or more of the I/O port(s) 306 and/or communication port(s) 308, thereby transforming the computer system 300 in FIG. 3 to a special purpose machine for implementing the operations described herein. Examples of the computer system 300 include personal computers, terminals, workstations, mobile phones, tablets, laptops, personal computers, multimedia consoles, gaming consoles, set top boxes, the UE 102, and the like.

The one or more data storage device(s) 304 may include any non-volatile data storage device capable of storing data generated or employed within the computer system 300, such as computer-executable instructions for performing a computer process, which may include instructions of both application programs and an operating system (OS) that manages the various components of the computer system 300. The data storage device(s) 304 may include, without limitation, magnetic disk drives, optical disk drives, solid state drives (SSDs), flash drives, and the like. The data storage devices 304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The data storage device(s) 304 may include volatile memory (e.g., dynamic random access memory (DRAM), static random access memory (SRAM), etc.) and/or non-volatile memory (e.g., read-only memory (ROM), flash memory, etc.). The data storage device may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Computer program products containing mechanisms to effectuate the systems and methods in accordance with the presently described technology may reside in the data storage device(s) 304, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures. The machine-readable media may store instructions that, when executed by the processor, cause the systems to perform the operations disclosed herein.

In some implementations, the computer system 300 includes one or more ports, such as the one or more input/output (I/O) port(s) 306 and the one or more communication port(s) 308, for communicating with other computing, network, or reservoir development devices. It will be appreciated that the I/O port(s) 306 and the communication port(s) 308 may be combined or separate and that more or fewer ports may be included in the computer system 300.

The I/O port(s) 306 may be connected to an I/O device, or other device, by which information is input to or output from the computer system 300. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computer system 300 via the I/O port 306. Similarly, the output devices may convert electrical signals received from computer system 300 via the I/O port 306 into signals that may be sensed as output by a human, such as sound, light, and/or touch. The input device may be an alphanumeric input device, including alphanumeric and other keys for communicating information and/or command selections to the processor 302 via the I/O port 306. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a projector, a speaker, a tactile and/or haptic output device, and/or the like. In some implementations, the input device and the output device may be the same device, for example, in the case of a touchscreen.

In one implementation, a communication port 308 is connected to a network by way of which the computer system 300 may receive network data useful in executing the methods and systems set out herein as well as transmitting information and network configuration changes determined thereby. For instance, the communication port 308 may use any of the 3GPP access layer 104 protocols discussed. Examples of such networks or connections include, without limitation, a 3GPP access layer 104 connection (e.g., an S1 MME interface or an S2 interface), Universal Serial Bus (USB), Ethernet, Wi-Fi, Bluetooth®, Near Field Communication (NFC) and so on. One or more such communication interface devices may be utilized via the communication port 308 to communicate to one or more other machines, either directly over a point-to-point communication path, over a wide area network (WAN) (e.g., the Internet), over a local area network (LAN), over a cellular (e.g., third generation (3G) or fourth generation (4G) or fifth generation (5G) network), or over another communication means. Further, the communication port 308 may communicate with an antenna or other link for electromagnetic signal transmission and/or reception.

In an example implementation, operations performed by the systems discussed herein may be embodied by instructions stored on the data storage devices 304 and executed by the processor 302. One or more of the computer system 300 may be integrated with or otherwise form part of the UE 102, the first small cell access node 106, the second small cell access node 108, the third small cell access node 110, and/or the macro cell access nodes 112.

The computer system 300 set forth in FIG. 3 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. The accompanying method claims present elements of the various steps in a sample order, and are not necessarily meant to be limited to the specific order or hierarchy presented.

Figure 4:
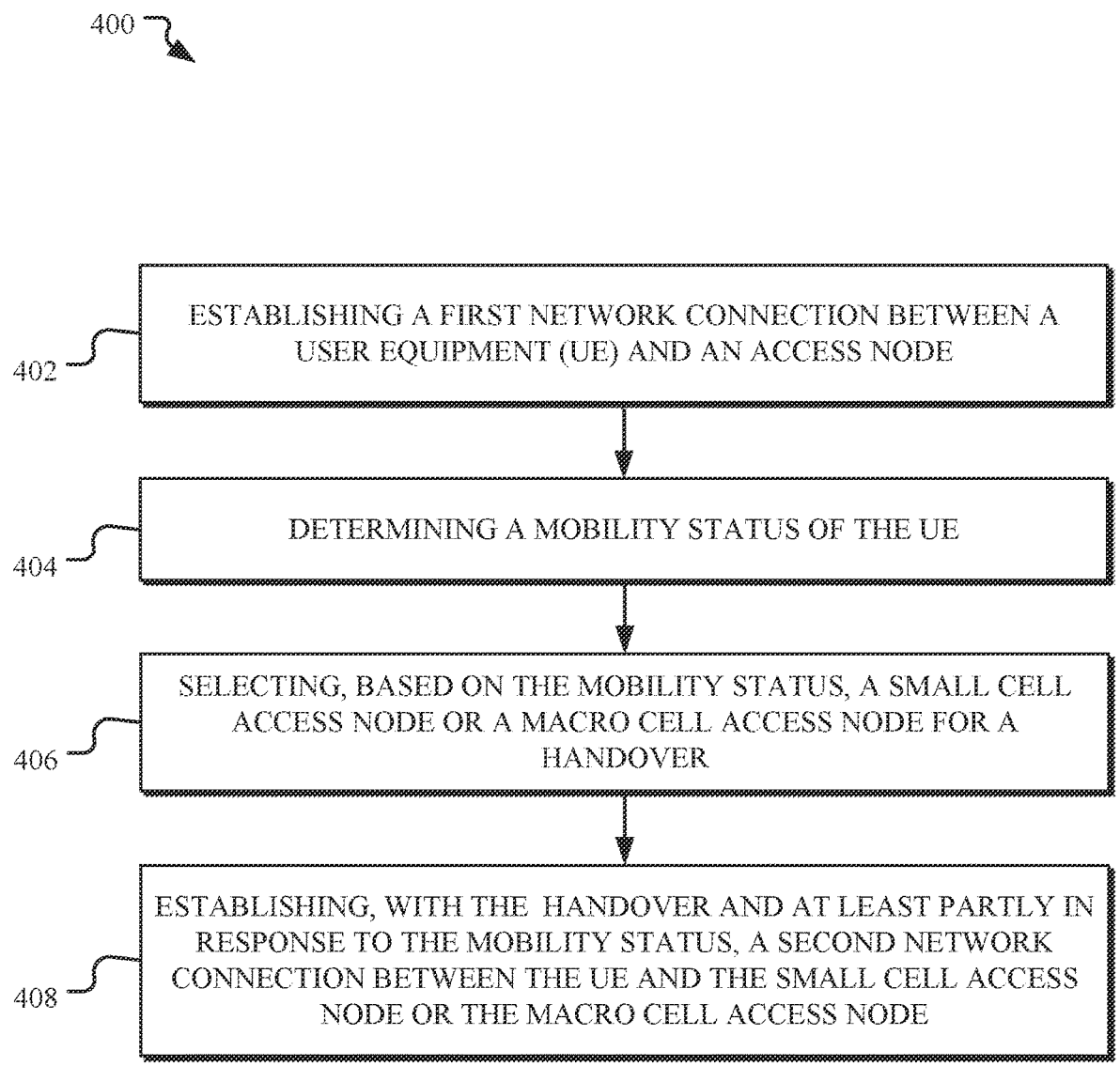
FIG. 4 illustrates example operations of a method for performing handovers for a UE based on a mobility status of the UE, which may be performed by any of the systems discussed herein.

FIG. 4 illustrates an example method 400 for performing handovers for the UE 102 based on the mobility status 124 of the UE 102, which may be performed by any of the systems discussed herein. At operation 402, the method 400 may include establishing the first network connection 218 between the UE 102 and an access node of the access layer 104 (e.g., the first small cell access node 106). At operation 404, the method 400 may include determining the mobility status 124 of the UE 102 (e.g., whether the mobility status 124 is the low mobility status, the medium mobility status, or the high mobility status). At operation 406, the method 400 may include selecting, based on the mobility status 124, a small cell access node (e.g., the second small cell access node 108 or the third small cell access node 110) or the macro cell access node 112 for the handover. At operation 408, the method 400 may include establishing, with the handover and at least partly in response to the mobility status 124, the second network connection 220 between the small cell access node or the macro cell access node 112.

Figure 5:
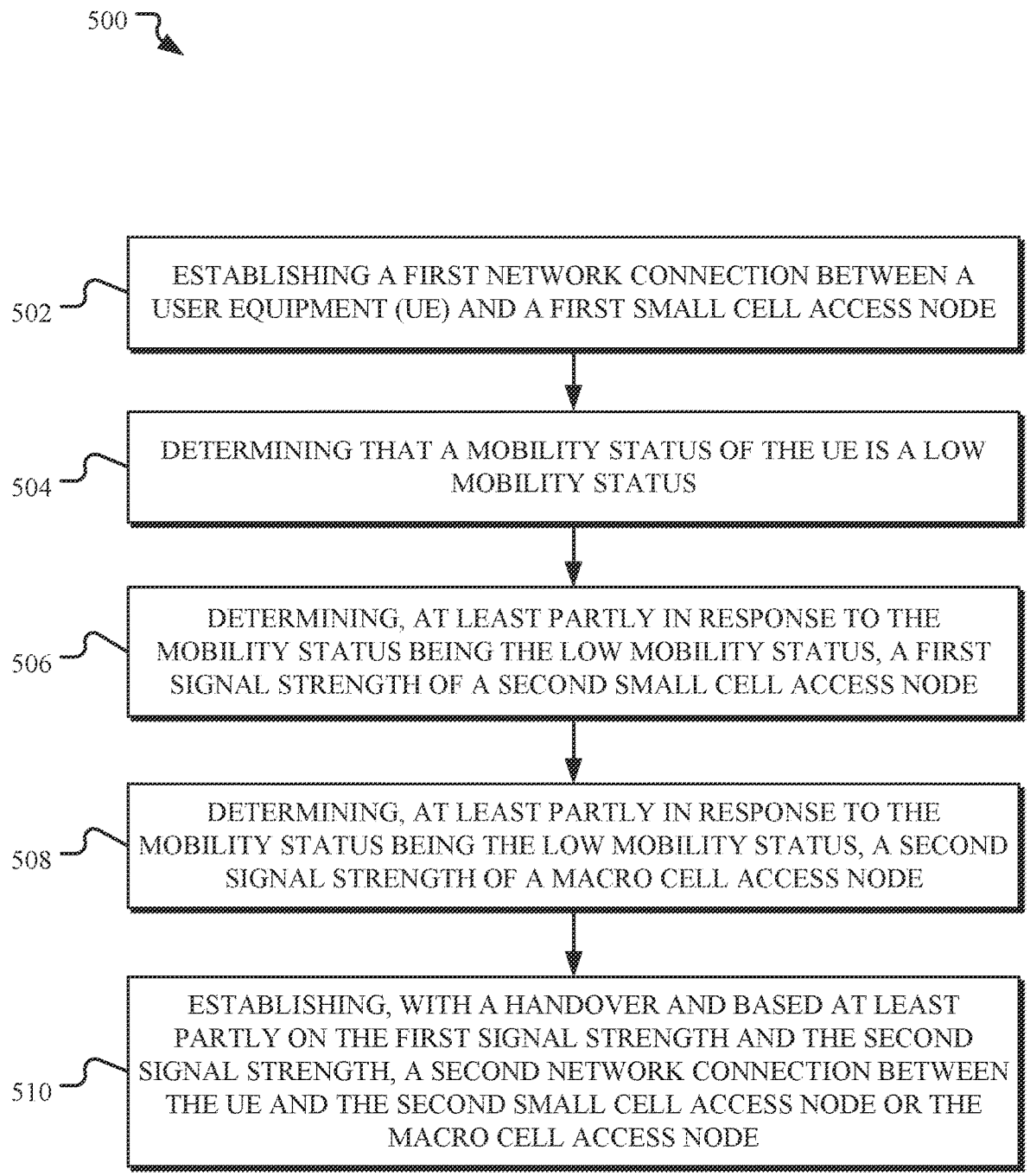
FIG. 5 illustrates example operations of a method for performing handovers for a UE based on a mobility status of the UE, which may be performed by any of the systems discussed herein.

FIG. 5 illustrates an example method 500 for performing handovers for the UE 102 based on the mobility status 124 of the UE 102, which may be performed by any of the systems discussed herein. At operation 502, the method 500 may include establishing the first network connection 218 between the UE 102 and the first small cell access node 106. At operation 504, the method 500 may include determining that the mobility status 124 of the UE 102 is the low mobility status. At operation 506, the method 500 may include determining, at least partly in response to the mobility status 124 being the low mobility status, the first signal strength value 208 of the second small cell access node 108. At operation 508, the method 500 may include determining, at least partly in response to the mobility status 124 being the low mobility status, the second signal strength value 210 of the macro cell access node(s) 112. At operation 510, the method 500 may include establishing, with the handover and based at least partly on the first signal strength value 208 and the second signal strength value 210, the second network connection 220 between the second small cell access node 108 or the macro cell access node 112.

Figure 6:
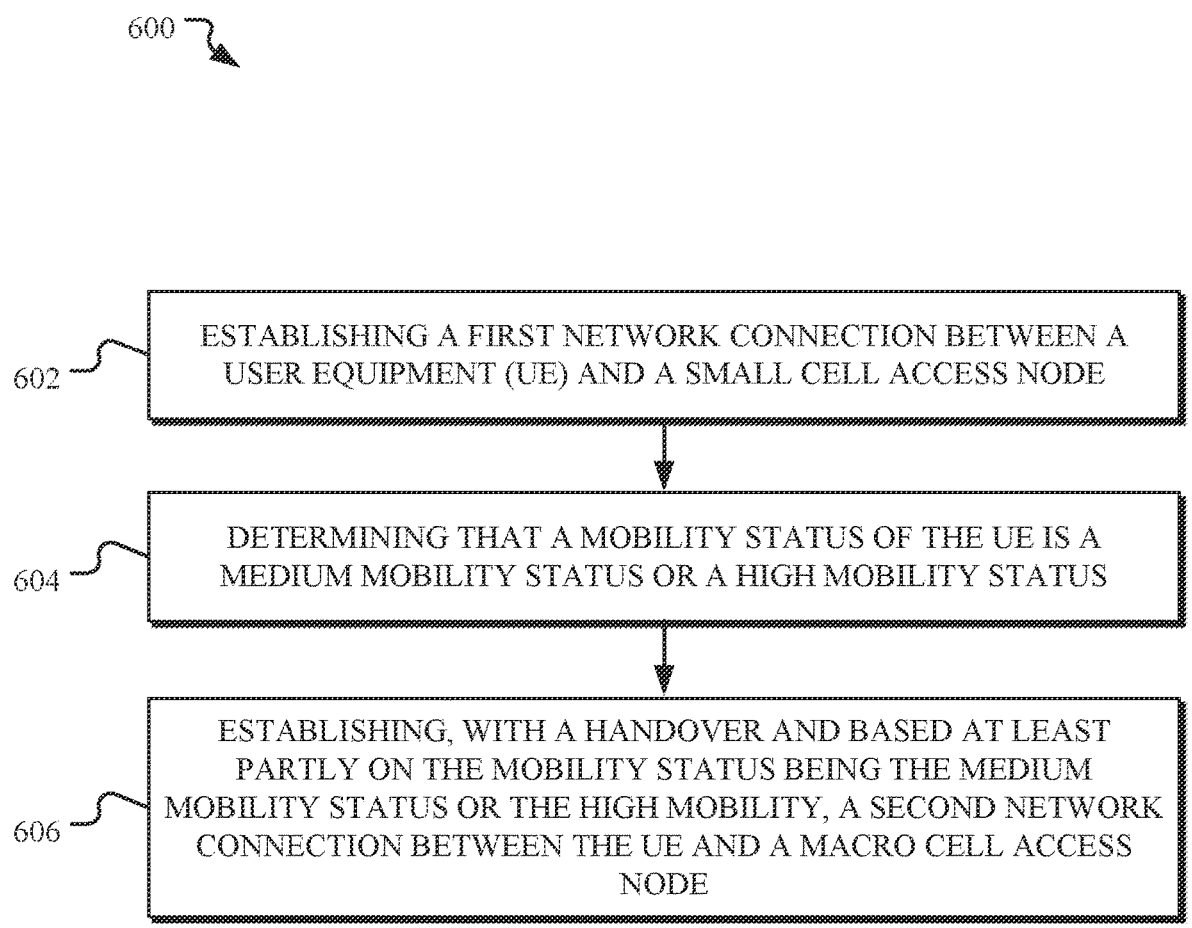
FIG. 6 illustrates example operations of a method for performing handovers for a UE based on a mobility status of the UE, which may be performed by any of the systems discussed herein.

FIG. 6 illustrates an example method 600 for performing handovers for the UE 102 based on the mobility status 124 of the UE 102, which may be performed by any of the systems discussed herein. At operation 602, the method 600 may include establishing the first network connection 218 between the UE 102 and a small cell access node (e.g., the first small cell access node 106). At operation 604, the method 600 may include determining that the mobility status 124 of the UE 102 is the medium mobility status or the high mobility status. At operation 606, the method 600 may include establishing, with the handover and based at least partly on the mobility status 124 being the medium mobility status or the high mobility status, the second network connection 220 between the UE 102 and the macro cell access node 112.

It is to be understood that the specific order or hierarchy of operations in the methods depicted in FIGS. 4-6 are instances of example approaches and can be rearranged while remaining within the disclosed subject matter. For instance, any of the operations depicted in FIGS. 4-6 may be omitted, repeated, performed in parallel, performed in a different order, and/or combined with any other of the operations depicted in FIGS. 4-6.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method for managing handovers for a user equipment (UE) connected to a first network via a first small cell access node of one or more access nodes, the method comprising:
   determining a mobility status of the UE;
   determining a first signal strength of the UE with a second small cell access node of the one or more access nodes;
   determining a second signal strength of the UE with a macro cell access node; and
   establishing, with a handover and based at least partly on the mobility status and one or both of the first signal strength and the second signal strength, a second network connection between the UE and the second small cell access node or the macro cell access node, and the first small cell access node, the second small cell access node, and the macro cell access node operate on a common service frequency.

2. The method of claim 1, wherein:
the second small cell access node operates on a first frequency;
the macro cell access node operates on a second frequency; and
establishing the second network connection includes instructing the UE to connect to the first frequency or the second frequency in response to the mobility status.

3. The method of claim 2, wherein the first small cell access node, the second small cell access node, and the macro cell access node are associated with a common Public Land Management Network (PLMN) value.

4. The method of claim 1 wherein:
the second small cell access node is associated with a first Public Land Management Network (PLMN) value;
the macro cell access node is associated with a second PLMN value; and
establishing the second network connection includes instructing the UE to connect to the first PLMN value or the second PLMN value at least partly in response to the mobility status.

5. The method of claim 1, wherein determining the mobility status of the UE includes determining that the UE has a low mobility status.

6. The method of claim 5, wherein the mobility status is a first mobility status, the handover is a first handover, and the method further comprises:
determining a second mobility status of the UE, the second mobility status being a medium mobility status or a high mobility status; and
establishing, with a second handover and based at least partly on the second mobility status being the medium mobility status or the high mobility status, a third connection with the macro cell access node.

7. The method of claim 1, wherein the common service frequency is a common Citizens Broadband Radio Service (CBRS) frequency.

8. A method for managing handovers for a user equipment (UE) connected to a first network via a first small cell access node of one or more small cell access nodes, the method including:
determining an average active connection time for the UE;
determining whether the average active connection time exceeds a threshold value;
determining a mobility status of the UE based at least partly on whether the average active connection time exceeds the threshold value, the mobility status being a low mobility status, a medium mobility status, or a high mobility status;
selecting, based on the mobility status, a second small cell access node of the one or more small cell access nodes or a macro cell access node for a handover; and
establishing, with the handover, a second network connection between the UE and the second small cell access node or the macro cell access node.

9. The method of claim 8, wherein the mobility status is the low mobility status and establishing the second network connection is, at least partly in response to the low mobility status, based on a first signal strength of the first small cell access node and a second signal strength of the macro cell access node.

10. The method of claim 9, wherein the mobility status is a first mobility status, the handover is a first handover, and the method further comprises:
determining that a second mobility status of the UE is the medium mobility status or the high mobility status; and
establishing, with a second handover, a third network connection between the UE and the macro cell access node based on the second mobility status of the UE being the medium mobility status or the high mobility status.

11. The method of claim 8, wherein the mobility status is the medium mobility status or the high mobility status and establishing the second network connection includes, in response to the medium mobility status or the high mobility status, establishing the second network connection with the macro cell access node.

12. The method of claim 11, wherein the mobility status is a first mobility status, the handover is a first handover, and the method further comprises:
determining a second mobility status of the UE, the second mobility status being the low mobility status; and
establishing, with a second handover, a third network connection between the UE and a third small cell access node based on the second mobility status of the UE being the low mobility status.

13. The method of claim 8, further comprising:
determining a number of previous cell reselections for the UE or previous handovers for the UE; and
determining whether the number exceeds one or more threshold values, the mobility status being based on whether the number exceeds the one or more threshold values.

14. The method of claim 8, wherein:
the second small cell access node is associated with a first public land mobility network (PLMN) value;
the macro cell access node is associated with a second PLMN value that is different than the first PLMN value; and
establishing the second network connection includes instructing the UE to connect to the first PLMN or the second PLMN at least partly in response to the mobility status.

15. The method of claim 8, wherein:
the second small cell access node operates on a first frequency;
the macro cell access node operates on a second frequency that is different than the first frequency; and
establishing the second network connection includes instructing the UE to connect to the first frequency or the second frequency at least partly in response to the mobility status.

16. The method of claim 8, further comprising:
determining one or more device parameters of the UE, the one or more device parameters including at least one of a type of device or a device state, wherein selecting the second small cell access node or the macro cell access node is based at least partly on the one or more device parameters.

17. The method of claim 16, wherein the type of device is a cellular type of device or an internet-of-things (IoT) type of device and the device state is a connected mode or an idle mode.

18. The method of claim 17, wherein establishing the second network connection is part of a load balancing process performed by the first small cell access node.

19. An access node for managing handovers for a user equipment (UE), the access node including:
   one or more processors; and
   one or more memory devices storing instructions that, when executed by the one or more processors, cause the access node to:
      establish a first network connection with the UE;
      determine a device parameter of the UE by determining a type of device of the UE;
      determine whether a mobility status of the UE is a low mobility status, a medium mobility status, or a high mobility status;
      determine, if the mobility status of the UE is the low mobility status, a first signal strength between the UE and a small cell access node;
      determine, if the mobility status of the UE is the low mobility status, a second signal strength between the UE and a macro cell access node;
      establish, if the mobility status of the UE is the low mobility status, a second network connection between the UE and the small cell access node or the macro cell access node based at least partly on the first signal strength, the second signal strength, and the type of device; and
      establish, if the mobility status of the UE is the medium mobility status or the high mobility status and based at least partly on the type of device, the second network connection between the UE and the macro cell access node.

20. The access node of claim 19, wherein determining the type of device for the UE includes determining whether the UE is a cellular device type, an Internet-of-Things (IoT) device type, a wearable device type, or an automobile device type.

* * * * *